United States Patent [19]

Guibert

[11] 4,381,443

[45] Apr. 26, 1983

[54] PORTABLE UNIT FOR HEATING PACKAGED FOOD

[75] Inventor: Raul Guibert, Los Angeles, Calif.

[73] Assignee: Sunset Ltd., Los Angeles, Calif.

[21] Appl. No.: 322,084

[22] Filed: Nov. 17, 1981

Related U.S. Application Data

[63] Continuation-in-part of Ser. No. 277,027, Jun. 24, 1981.

[51] Int. Cl.[3] .............................................. H05B 1/00

[52] U.S. Cl. ...................................... 219/400; 99/447; 126/21 A; 126/110 A; 219/271; 219/385

[58] Field of Search ............... 219/369, 370, 371, 372, 219/385, 386, 388, 400, 401; 126/21 A, 110 A, 248, 261, 268, 285 A; 99/355, 447, 474; 165/107 R; 186/1 R; 206/499; 220/DIG. 13; 312/236

[56] References Cited

U.S. PATENT DOCUMENTS

| | | | |
|---|---|---|---|
| 3,221,729 | 12/1965 | Beasley et al. | 126/21 A |
| 3,439,665 | 4/1969 | Stromgrist | 126/21 A |
| 4,010,341 | 3/1977 | Ishammar | 219/400 |
| 4,038,968 | 8/1977 | Rowell | 126/261 |
| 4,089,322 | 5/1978 | Guibert | 126/261 |
| 4,113,977 | 9/1978 | Hochstrasser et al. | 219/400 X |
| 4,307,286 | 12/1981 | Guibert | 219/400 |
| 4,327,279 | 4/1982 | Guibert | 219/400 |

*Primary Examiner*—Volodymyr Y. Mayewsky
*Attorney, Agent, or Firm*—Michael Ebert

[57] ABSTRACT

A portable unit for heating packages containing pre-cooked cold food, the unit acting to rapidly heat up the food to a service temperature level and to thereafter maintain this level. The unit includes a case having a rack therein divided by shelves into a series of compartments, each adapted to receive a food package. Standing vertically behind the rack is an air modulator including a stationary outer tube having a series of longitudinally-aligned ports communicating with the respective compartments. Rotating within the outer tube is an inner tube having a series of angularly-displaced holes which successively register with the ports in the course of a rotary cycle. Air drawn from the free region in the front of the rack is conveyed through a heater station and from there blown into the inner tube to create a pressure differential between the free region and the inner tube. As a consequence, the heated air is projected successively through the ports into the compartments whereby the heated air flowing at high velocity through each compartment has a pulsatory waveform which acts to rapidly heat the food therein.

12 Claims, 6 Drawing Figures

CONTROL CENTER
22
19
20
21
18
Au
AIR RECIRCULATION
15
(+)
P1
D1
16
O1
H1
H2
D2
(−)
P2
Af
O2
H3
D3
V2
P3
V1
O3
AR
17

11
H
13
12
14
12
14
10

19
18

D1
13
15
14

CONTROL CENTER
22
19
20
21
18
15
16
P1
D1
O1
H1
H2
D2
P2
O2
H3
D3
P3
O3
V2
V1
17
Au
AIR RECIRCULATION
(+)
(−)
Af

CONTROL CENTER
AIR RECIRCULATION

PORTABLE UNIT FOR HEATING PACKAGED FOOD

RELATED APPLICATIONS

This application is a continuation-in-part of my prior application Ser. No. 277,027, filed June 24, 1981 for "Counter-Top Oven for Heating Packaged Food," which application relates back to earlier-filed applications identified therein. The entire disclosures in these related applications are incorporated herein by reference.

BACKGROUND OF INVENTION

This invention relates generally to food heating units, and more particularly to a counter-top unit which is usable in homes and offices and is adapted rapidly to reheat a stack of such packages containing pre-cooked food in a cold state to a service temperature level and to maintain the food at this level for an indefinite period.

To satisfy the growing need for quickly prepared inexpensive meals, convenience food systems have been developed in which the meals to be later served are first cooked, packaged, and then deep-freezed. When one wishes to eat a particular meal, the selected package is taken out of the freezer and the frozen pre-cooked meal is then thawed and reheated. Typical of such operations is the so-called TV dinner in which a pre-cooked meal in the frozen state is sealed within a serving tray. The dinner ks kept in the freezer until a demand therefor arises, at which point the TV dinner is thawed and reheated in a microwave oven, a convection oven or whatever heater unit is available. The term "packages" as used herein is intended to cover any sealed dish, tray, pouch or other hard or soft container having pre-cooked food therein.

In reheating a pre-cooked frozen meal in homes and offices, it is difficult when going from the cold state to a service level in a conventional hot air oven, to avoid a situation in which the core of the metal is still cold even though the outer layer is hot. And when one seeks to ensure that the body of the food is hot throughout, there is a tendency to overheat the meal in the oven and thereby re-cook it, with a resultant loss in nutritional value and flavor. But even when the meal has been heated to a proper serving level, it must be served without delay, for with the typical oven it is virtually impossible to thereafter hold the meal at this level until such time as there is a demand therefor.

For a convenience food operation to be effective, one must be able to reheat the pre-cooked meal to a proper service temperature level within a relatively short period, taking into account that in a home and office, the time at which diners are ready to eat may be subject to change. Thus in a typical office having several staff members, all of whom intend to lunch at, say, noon, it is not at all unusual for one or more of the members to be unavailable until, say, an hour or so later. Existing ovens for reheating precooked frozen meals cannot cope with this common contingency.

In my copending application Ser. No. 277,027, whose entire disclosure is incorporated herein by reference, there is disclosed a counter-top unit usable in homes and offices for reheating packages containing precooked meals whereby the packages are rapidly brought from the cold or frozen state to a service temperature level and thereafter maintained indefinitely at this level without overheating and recooking.

The counter top unit disclosed in my prior application includes a case having an apertured partition therein to form a compartment, accessible from the front of the case for accommodating a stack of food packages with air-flow spaces therebetween. The compartment is spaced from the rear of the case to define a plenum and from the front to define an air curtain passage communicating with upper and lower air passages leading to plenum. In operation, air drawn from the upper passage is heated and blown into the plenum to create a pressure differential between the plenum and the compartment, as a result of which the heated air is forced through the partition into the spaces between the packages to heat the food therein, the heated air also flowing in a continuous loop about the compartment through the passages to thermally isolate the compartment.

In the heat-up phase, the heated air is in the form of pulsatory wave in which the pulses are at a temperature above the service level, these pulses being separated by lower temperature intervals during which heat from the outer layer of the food is transferred into the body thereof to prevent the food from being heated above the service level. In the subsequent service phase, the temperature of the air is held at the service temperature level.

Heat is provided in this counter-top unit by high-wattage and low-wattage electrical resistance elements, both of which are energized in the heat-up phase to provide the required high temperature. However, in the heat-up phase, the operation of the high-wattage element is periodically interrupted whereby the meals are then subjected to pulses of high temperature air separated by relatively low temperature intervals during which heat from the outer layer of food is transferred to the intermediate layers and the core thereof to prevent the outer layer from being heated above the service temperature. When the body of the meals reaches the service temperature level, the unit switches over to a service phase in which only the low-wattage heater element is energized and thermostatically-controlled to maintain the food at the service temperature level for an indefinite period.

The practical problem with my prior arrangement for producing a pulsatory hot air wave is that when electrical resistance heater elements are used, even after the energization current is interrupted, residual heat retained by the element continues to heat the air passing thereover. Hence with relatively rapid pulse rates, it is difficult to obtain well-defined hot air pulses; for in some instances, the amount of heat in the intervals between pulses is excessive.

SUMMARY OF INVENTION

In view of the foregoing, the main object of this invention is to provide a counter-top unit of simple yet efficient design usable in homes and offices for reheating packages containing pre-cooked meals so that they are brought from the cold or frozen state to a service temperature level in a relatively short period and thereafter maintained indefinitely at this level, heating being effected by a stream of continuously heated air whose flow is periodically interrupted to produce a pulsatory wave.

Thus in the present invention, a pulsatory wave of heated air is produced without interrupting energization of the heater elements, as a result of which well defined pulses are produced.

Another object of the invention is to provide a unit of the above type which is highly compact and which may be manufactured at low cost.

Briefly stated, these objects are accomplished in a portable unit for heating packages containing pre-cooked cold food, the unit acting to rapidly heat up the food to a service temperature level and to thereafter maintain this level. The unit includes a case having a rack divided by shelves into a series of compartments, each adapted to receive a food package. Standing vertically behind the rack is an air modulator including a stationary outer tube having a series of longitudinally-aligned ports communicating with the respective compartments. Rotating within the outer tube is an inner tube having a series of angularly displaced holes which successively register with the ports in the course of a rotary cycle.

Air drawn from the free region in front of the rack is conveyed through a heater station and from there blown into the inner tube to create a pressure differential between the free region and the inner tube. As a consequence, the heated air is projected successively through the port into the compartments whereby the heated air flowing through each compartment at high velocity has a pulsatory waveform which acts to rapidly heat the food therein.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

First Embodiment

Figure 1:
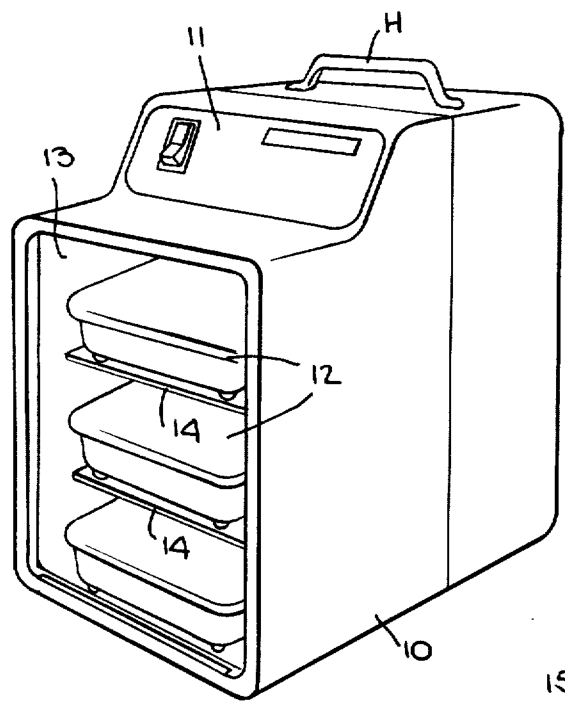
FIG. 1 is a perspective view of a first embodiment of a unit in accordance with the invention.
Figure 2:
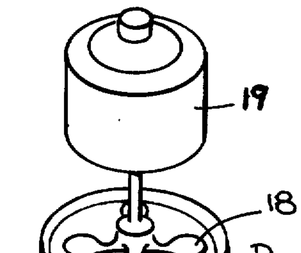
FIG. 2 is a perspective view of the rack and the air modulator included in the FIG. 1 unit.
Figure 2:
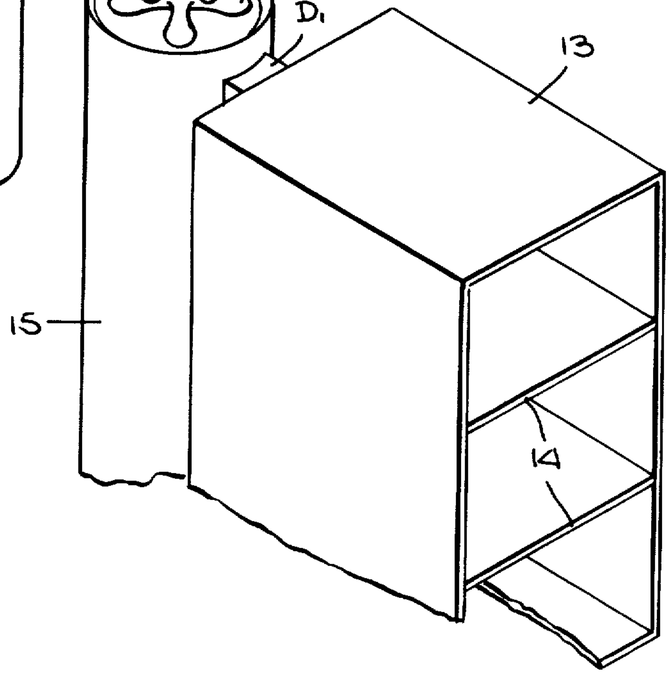
Figure 3:
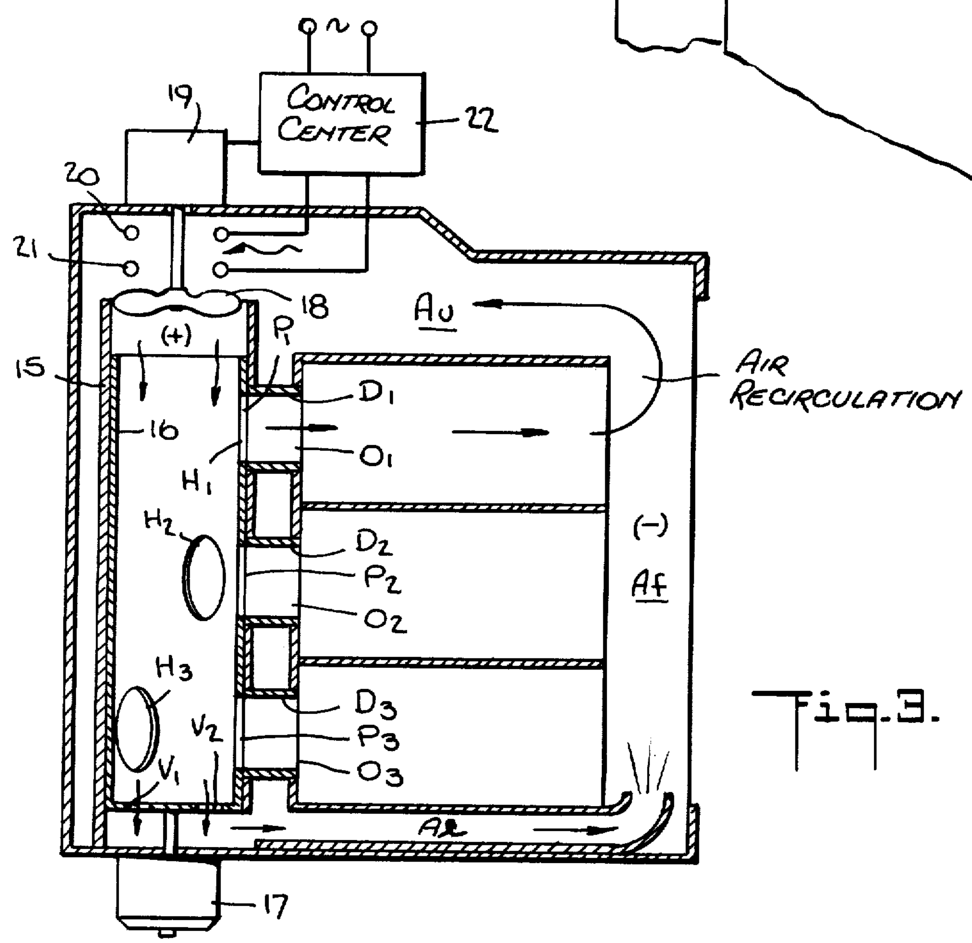
FIG. 3 shows the FIG. 1 unit in a section taken vertically therethrough.

Referring now to FIG. 1, a unit in accordance with the invention for reheating packages containing frozen pre-cooked meals includes a box-like case 10 having an open front. The case further includes an upper section adapted to house control devices and including a control panel 11 on which there are mounted switches, indicators and other control elements. Because the unit is both light weight and compact, it is portable and may be carried by means of a handle H.

In practice, the unit may be provided with a front door to close the unit except when food packages are being loaded therein or withdrawn. But because the unit, as will later be evident, generates a front air curtain which thermally isolates the food packages from the exterior sphere, a door is not an essential component thereof. In the absence of a door, one has immediate access to the interior of the unit.

The unit is loaded with a stack of three trays 12 of identical rectangular shapes. The trays or packages all contain precooked meals in the frozen state, the trays having been taken from a storage freezer and put in the unit about an hour before the scheduled meal-time to allow for adequate heat-up. While rectangular trays are shown, the unit is operable with round or other tray configurations, as long as the trays fit within the compartment of the unit. The unit is also operable with food packages in soft plastic-pouch form.

In practice, each tray may carry an identifying front label, so that if three different meals are to be served, these will be indicated on the trays. And if for any reason, one or more trays is left over after meal time, they may be returned to the freezer for refreezing subsequent reheating. The unit acts only to reheat and does not recook or otherwise impair the quality of the meals; hence repeated refreezings and reheatings can be tolerated within practical limits.

Each tray is received in a separate compartment formed in a rack 13 nested within case 10, rack 13 being divided by shelves 14 into a series compartments. Positioned vertically behind rack 13 in the rear space in the case is an air modulator. The modulator includes an outer tube 15 provided with a series of longitudinally aligned ports $P_1$, $P_2$ and $P_3$ which communicate through ducts $D_1$, $D_2$ and $D_3$ with corresponding openings $O_1$, $O_2$ and $O_3$ in the rear of the three compartments in the rack. While a rack arrangement with three compartments is shown, in practice the unit may contain four or more compartments, in which case the modulator includes an equal number of ports.

Supported for rotation within outer tube 15 is an inner tube 16 driven by a gear motor 17. Inner tube 16 is provided with a series of angularly-displaced holes $H_1$, $H_2$ and $H_3$, so that in the course of a rotary cycle, first hole $H_1$ registers with port $P_1$ to feed air into opening $O_1$ of the first compartment; then hole $H_3$ registers with port $P_2$ to feed air into opening $O_2$ of the second compartment; and finally, hole $H_3$ registers with port $P_3$ to feed air into opening $O_3$ of the third compartment. This sequential operation is repeated with each cycle. Inner tube 16 also includes at its bottom end two vent holes $V_1$ and $V_2$.

Rack 13 is supported within case 10 so as to define an upper air passage $A_u$ and a lower air passage $A_1$ which lead, respectively, to the upper and lower ends of the rear spaces in the case, and a front air passage $A_f$ which joints the upper and lower passages. Air drawn from the front region of the case is drawn through upper air passage $A_u$ by a propeller 18 driven at high speed by a motor 19 to provide a blower. Propeller 18 operates within the upper end of outer tube 15 so that the air is blown into the inner tube 16. The air is heated by high-wattage and low-wattage heater elements 20 and 21, whose energization if controlled by an electronic control center 22 placed within upper section 11 of the case.

The heated air blown into the inner tube 16 creates a positive pressure (+) therein, whereas the air drawn from the free front region of the case creates a negative pressure (−) therein. As a consequence of this pressure differential, when a given compartment communicates with the inner tube through the air modulator, hot air rushes at high velocity from the inner tube through the compartment to heat the food package therein.

At the same time, air discharged from vents $V_1$ and $V_2$ of the inner tube in the lower end of the rear space in the case is drawn through lower passage $A_1$ into front passage $A_f$, and from there through upper passage $A_u$ back into the upper end of the rear space to create a continuous flow loop about rack 13. Thus the hot air passing across the front passage $A_f$ acts as an air curtain to thermally isolate the rack and its contents from the atmosphere despite the absence of a door on the case.

During the heat-up phase when the food is to be rapidly raised in temperature from its initial cold state to a service temperature level of, say, about 150° F., both heaters 20 and 21 are energized by the control center 22 for a period determined by a timer, typically for 45 minutes or an hour. During this phase, each compartment is subjected periodically to a blast or pulse of hot air whose temperature is well above the service temperature level, this pulse being followed by a no-flow interval whose duration is determined by the rotary cycle. Thus in the course of a rotary cycle hot air is admitted sequentially from the air modulator into the series of compartments.

If hot air flow into each compartment were not interrupted, because the temperature thereof is much above the service level, the outer layer of the food would, in short order, heat up to a level resulting in recooking or scorching of the meal, whereas the intermediate layers and the core would still lie below the service temperature.

But in a unit in accordance with the invention, the flow is not continuous, but in the form of hot air pulses, each followed by a relatively long no-flow interval. While the temperature of the hot air pulses is very high and above the service temperature level, because during the low-temperature no-flow intervals heat is transferred from the outer layer of the food body to the intermediate layer and from there to the core of the body, this brings about a reduction in the temperature of the outer layer which prevents excessive heat-up thereof.

And because of the large differential between the hot air pulses and the outer food layer, rapid heat transfer takes place therebetween during the pulse periods even as the temperature of the outer layer approaches the service temperature level; for at this level there is still a large heat differential.

Thus it becomes possible with pulsatory wave heating during the heat-up phase to rapidly heat up the meals in the trays in a relatively short period; i.e., an hour or less. Control center 26 includes a timer that is pre-set so that upon completion of the heat-up phase, say, after 45 or 60 minutes, the system is switched over to operate continuously with the low wattage heater 21 "on." Heater 21 is then thermostatically governed to maintain the interior temperature of the unit at the service temperature for an indefinite period. A light indicator on the control panel is energized when the unit switches over to the service phase, thereby indicating that the meals are then in condition to be dispensed to diners.

While the units described herein are particularly useful in homes and offices in which large commercial ovens of the type disclosed in my earlier patent applications and patents are inappropriate, these units are also useful in motels, hospitals and for other sites where the need exists for a facility to dispense heated meals at odd hours without service personnel. Thus these units may be installed in motel rooms to operate in conjunction with corridor vending machines to supply guests with entrees, side dishes and other selected combinations stored in the frozen state, the selected items purchased from the machines then being placed in the room unit to be heated up and served.

Second Embodiment

In the first embodiment of the unit, heated air flows sequentially through each compartment in the rack toward the free region in front of the rack. At the same time, heated air is blown upwardly through the free region to create an air curtain which thermally isolates the rack and the food packages therein from ambient atmosphere, thereby dispensing with the need for a door.

Because of the pressure differential created between the pressurized air in the inner tube of the air modulator and the rack interior, air flows through the rack compartments at high velocity and impinges on the air curtain covering the front of the rack. This action may in some instances, depending on the prevailing air velocities, may partially disrupt the air curtain. This effect is undesirable; for then a door may be necessary to prevent the loss of heat energy from the unit.

Figures 4, 5, 6:
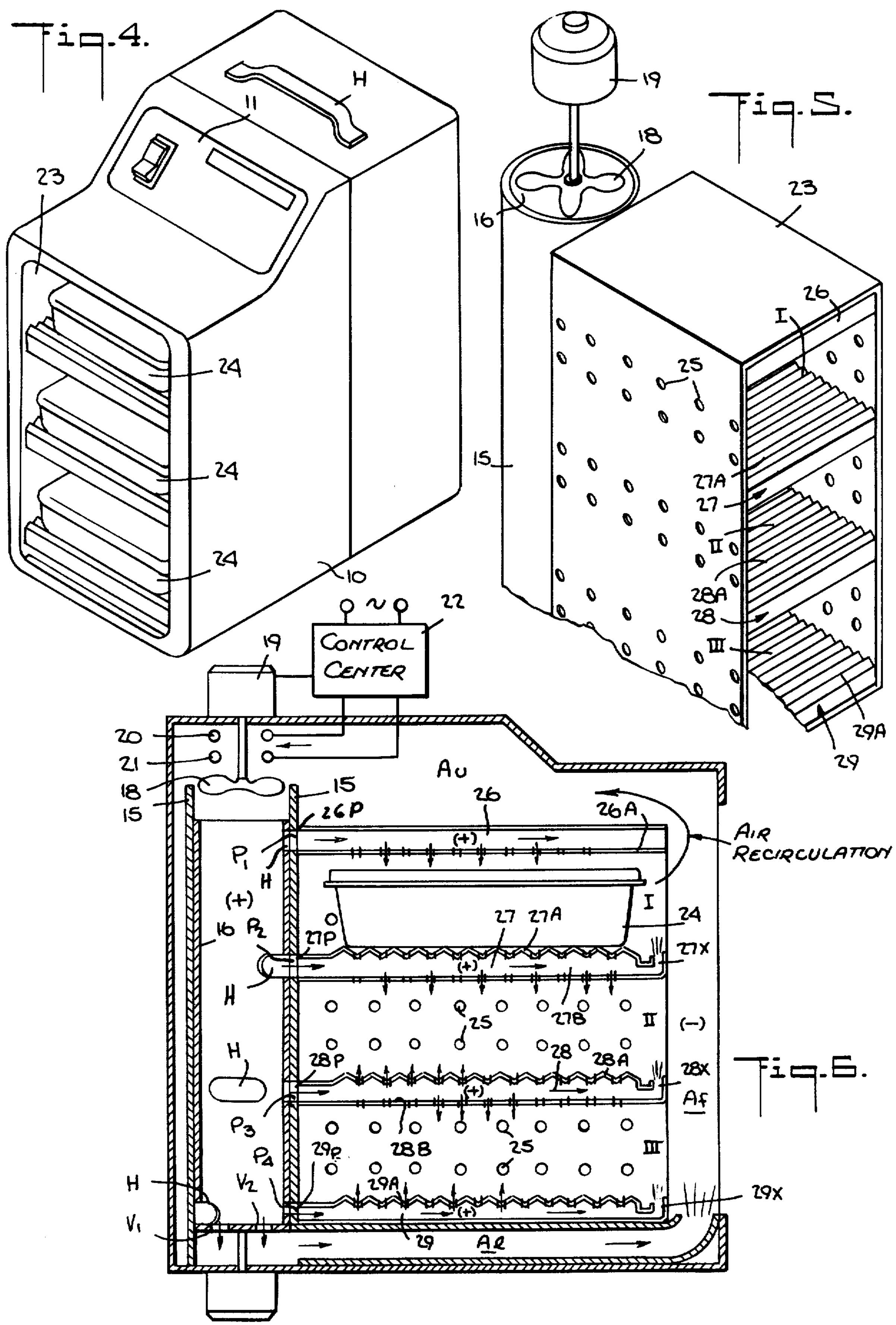
FIG. 4 is a perspective view of a second embodiment of a unit in accordance with the invention.
FIG. 5 is a perspective view of the rack and the air modulator included in the FIG. 4 unit.
FIG. 6 shows the FIG. 4 unit in a vertical section.

In the second embodiment of the unit illustrated in FIGS. 4, 5, and 6, the rack arrangement is such that pressurized air generated in the air modulator is caused to flow through the respective compartments at high velocity in a direction more or less parallel to the air curtain flow direction, thereby avoiding disruption of the air curtain regardless of the velocities involved. Moreover, the arrangement of the rack is such that each compartment has an individual air curtain developed across its entry to reinforce the effect of the main air curtain formed across the front of the rack.

In the unit illustrated in FIGS. 4, 5, and 6, the open-ended rack 23 is provided with three compartments I, II and III, to accommodate food packages. These may be in the form of trays which in this instance do not require spacer legs. The sides of the racks are provided with holes 25 which ventilate the compartments; hence the dimensions of the rack are such as to create an air space between the ventilated sides and the corresponding sides of the unit case 10, the hot air projected into the spaces returning to the heater station for recirculation in the unit.

The ceiling of compartment I is defined by a plenum 26 whose lower wall 26A is perforated. Plenum 26 has an input port 26P which registers with a port $P_1$ in the outer tube 15 of the air modulator. The inner tube 16 of the modulator is provided with a series of angularly-displaced holes H which, in the course of a revolution, sequentially register with the longitudinally-aligned ports $P_1$, $P_2$ etc. in outer tube 15.

The floor of compartment I is defined by a plenum 27 whose corrugated upper wall 27A is perforated, plenum 27 having an input port 27P which registers with port $P_2$ in outer tube 15. Plenum 27 also includes an upwardly-directed outlet 27X.

Thus when a hole H of the rotating inner tube 16 lies in registration with port $P_1$, hot air from the modulator at positive pressure (+) enters plenum 26 and is blown downwardly into compartment I which is at negative pressure (−) to heat the food in tray 24; and when a hole H lies in registration with port $P_2$, hot air from the modulator is blown upwardly into the compartment and is also blown through outlet 27X upwardly across the front of the compartment to create an individual air curtain thereacross.

The lower wall 27B of plenum 27 is also perforated so that hot air blown into this plenum is forced downwardly into compartment II. The floor of compartment II is formed by a plenum 28 whose corrugated upper wall 28A is perforated and whose lower wall 28B is also perforated so that when input port 28P of plenum 28 which registers with port $P_3$ in outer tube 15 receives hot air through a hole H in the rotating inner tube, the hot air is blown upwardly through compartment I and is at the same time blown downwardly through compartment III, this air also being discharged through outlet 28X upwardly across compartment II to create an individual air curtain thereacross.

A similar action occurs in compartment III whose floor is defined by a plenum 29 having a perforated corrugated upper wall 29A, an input port 29P which registers with port $P_4$ in the outer tube 15, and an outlet 29X.

Thus the operation of the second embodiment is similar to that of the first, except that the air blown into the horizontal compartments flows in a pattern normal thereto, the air in each compartment cyclically blowing up and down and also creating an individual air curtain thereacross to reinforce the main air curtain across the front of the inlet rack.

While there has been shown and described a preferred embodiment of a portable unit for heating packaged food in accordance with the invention, it will be appreciated that many changes and modifications may be made therein without, however, departing from the essential spirit thereof. Thus while the shelves in the compartment have been shown in fixed form, the shelves may be in slidable form so that they can be pulled out to facilitate the placement or removal of food packages.

I claim:

1. A unit for reheating packages containing cold precooked meals, the unit being adapted to rapidly heat up the meals to a service temperature level and to thereafter hold the meals at this level, said unit comprising:

(A) a case having a rack therein divided into a series of compartments each adapted to receive at least one of the food packages, said rack being positioned in the case to define a rear space therein;

(B) an air modulator vertically positioned in said rear space, said modulator having an outer tube provided with a series of longitudinally-aligned ports each communicating with a rear opening in a respective compartment, a rotating inner tube disposed within the outer tube and provided with a series of angularly-displaced holes which, in the course of a rotary cycle, sequentially register with a respective port, and means for rotating said inner tube; and (C) heating means to heat air and means to blow heated air drawn from the region in front of said rack into the inner tube to create a pressure differential between said inner tube and said region, whereby the heated air is sequentially projected at high velocity into the series of compartments through said holes.

2. A unit as set forth in claim 1, wherein said rack is positioned in said case to define a lower air passage between the bottom of the rack and the bottom of the case which communicates with the lower end of the rear space, an upper air passage between the top of the rack and the top of the case which communicates with the upper end of the rear space, and a front air passage at the front of the rack which joins said upper and lower air passages, and vents in the lower end of the inner tube whereby a portion of the hot air blown therein escapes through said vents and is caused to flow in a loop running from the lower end of the rear space through said lower air passage and through said front air passage and said upper air passage back to the upper end of said rear space, thereby forming an air curtain across said front passage.

3. A unit as set forth in claim 1, wherein said means to blow heated air into said inner tube is constituted by a blower fan disposed at the upper end of said outer tube.

4. A unit as set forth in claim 3, wherein said air is heated by low and high wattage electrical heater elements disposed in the rear space above the air modulator, both elements being energized during a timed heat-up phase, only one of the elements being energized during a subsequent service phase.

5. A unit as set forth in claim 1, wherein said packages are in the form of trays.

6. A unit as set forth in claim 1, wherein said packages are in the form of soft pouches.

7. A unit as set forth in claim 1, wherein said ports are connected by ducts to said openings in the rear of each compartment.

8. A unit as set forth in claim 1, wherein said compartments are defined by shelves in said rack.

9. A unit as set forth in claim 1, wherein said compartments are defined by upper and lower plenums having input ports communicating with the respective ports in the outer tube, each plenum having a perforated wall to direct hot air into the compartment.

10. A unit as set forth in claim 9, wherein each plenum has an outlet to direct hot air across the front of the compartment to create an individual air curtain thereacross.

11. A unit as set forth in claim 9, wherein said perforated wall has a corrugated form to provide a shelf for a food package.

12. A unit as set forth in claim 9, wherein said rack has ventilated sides.

* * * * *